Patented Aug. 26, 1941

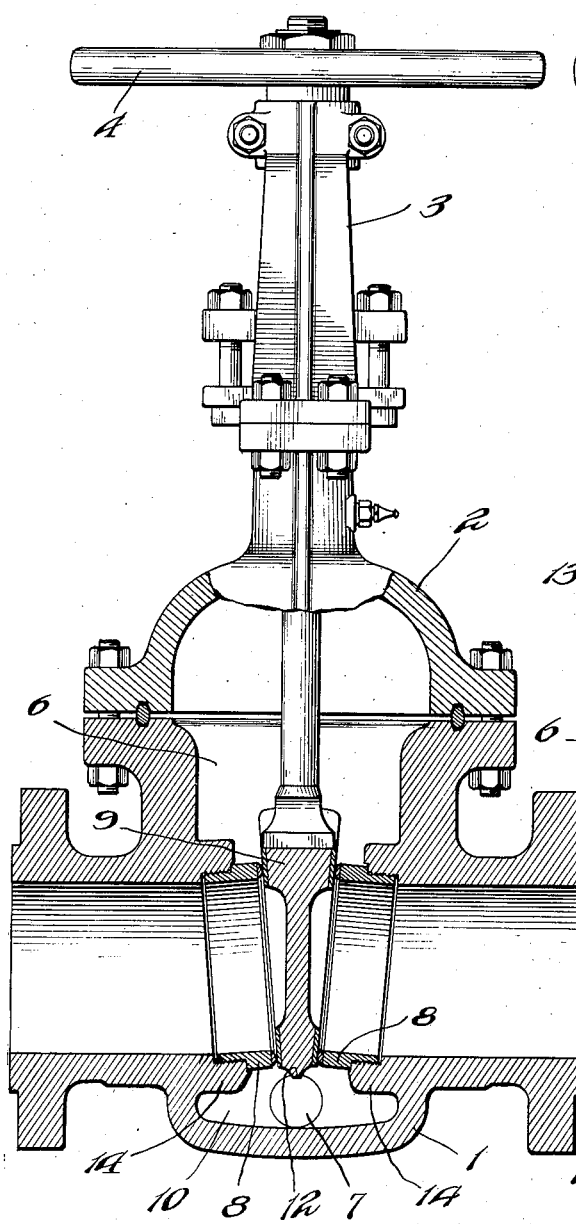
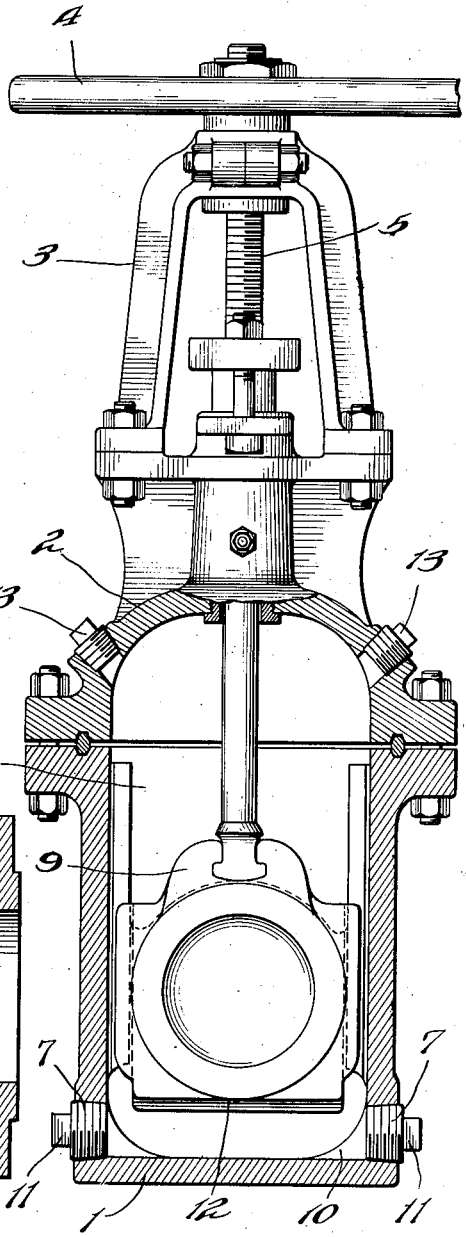

2,253,888

UNITED STATES PATENT OFFICE 2,253,888

VALVE

Ralph G. Carlson, Chicago, Ill., assignor to Crane Co., Chicago, Ill., a corporation of Illinois Application July 1, 1939, Serial No. 282,451

2 Claims. (Cl. 251—59)

This invention relates to a valve and more particularly to a valve having a cleanable sediment-collecting pocket.

In the pipeline transportation of fluids, especially crude petroleum, oil and gasoline, there are frequently included in the fluids particles of foreign matter, commonly referred to as sediment, which have a tendency to settle or precipitate from the fluid and collect in pockets, crevices and chambers where movement of the fluid may be relatively slow. One of the most prevalent of such pockets wherein sediment deposits occur is within a valve in the pipeline. Small amounts of sediment deposited within the valve may not necessarily be harmful to the valve or detrimental to the operation of the valve. However, should relatively large quantities of sediment be present in the fluid and settle within the valve serious damage may be done to the valve seating surfaces upon the closing of the valve, or the valve closure member may be prevented from reaching its seat or seats by reason of an accumulated mass of sediment becoming packed in the bottom portion of the valve. In such an event it is often necessary to shut down the complete pipeline, disassemble or remove the valve, and clean or repair the internal parts. However, I am aware that in the past others have provided sediment chambers and cleanout means on valves, but to my knowledge none has proved successful when in actual use on a pipeline for the reasons that the pocket was not made large enough, no provision was made conveniently for directing fluid into the pocket to wash out the loose or fine sediment so that it would be carried on through the pipeline, and no provision was made to circulate the fluid through all chambers of the valve to keep the fine particles of sediment from settling within the valve.

Accordingly, one of the more important objects of my invention lies in the provision of means for diverting a portion of the fluid, while the latter is passing through the valve, into an enlarged sediment chamber to cause a desired turbulence therein whereby fine and loose sediment deposited in the chamber will be washed up and carried out of the valve into the outlet end pipeline.

Another important object of my invention is to provide a valve having a sediment chamber below the closure member and seats thereof and having passageways interconnecting the said chamber with the cavity in the upper portion of the valve so that the circulation of fluid deflected into the said chamber is thereafter upwardly and inwardly toward a position above the line of fluid flow through the valve. Obviously, sediment washed out of the chamber will be carried to a position immediately above the fluid flowing through the valve and from there, either by settling or by being further carried by the deflected fluid, the natural course of the sediment is into the fluid stream and out of the valve through the outlet port.

A still further object of my invention lies in the provision of a plurality of rectilinear cleanout ports in a valve so that accumulated sediment may be removed from the inside of the valve, at any time the valve is in the closed position, without the necessity of disassembling the valve or removing it from the pipeline. The advantage of providing a plurality of rectilinear cleanout ports is that all of the interior chambers of the valve may readily be cleaned by rodding, as it is termed, or, if desired, by other suitable means.

Other important objects and advantages of my invention will become apparent in the following description of a gate valve embodying my invention. The description is to be read in connection with the drawing, in which Fig. 1 is a vertical side sectional view of the valve and shows a preferred embodiment of the invention.

Fig. 2 is a vertical sectional view of the valve taken at right angles to Fig. 1.

Like reference numerals refer to like parts.

Referring to Fig. 1, the valve shown, which is known in the art as a rising stem outside screw and yoke gate valve, comprises a body or casing 1 to which is secured a bonnet 2. The bonnet, except as hereinafter described in detail, together with the yoke 3 and the assembled operating parts, including the handwheel 4 and the stem 5, are of the usual construction well known to all those skilled in the art of valves. The body portion 1 is formed with a central chamber 6 closed by the bonnet 2. Into the chamber 6 lead a pair of the usual opposed and aligned fluid passageways or ports, and in the chamber at the mouth of each of said passageways there is a threaded recess to receive a seat ring 8. These seat rings are preferably disposed at an acute angle to each other to receive a wedge type gate or closure member 9 formed with annular seating faces adapted to seat upon the seat rings.

The sediment pocket 10, which is the lowermost portion of the chamber 6, is formed to provide a relatively large volume directly below the wedge and around the seat rings wherein sediment from the fluid in the passageway may collect. As shown more clearly in Fig. 2, the pocket 10 is provided with a pair of removable plugs 11 placed at opposite sides of the pocket to enable an operator to clean the pocket with a rod or other instrument simply by removing both of the plugs, as desired, while the valve is in the closed position, inserting the cleaning instrument in one of the openings and forcing the accumulated sediment out of the pocket through the other opening.

The lower portion of the gate 9 is provided with a depending lip 12 which, when the gate is in a partly raised position, deflects a portion of the fluid stream downwardly into the pocket. The resultant turbulence of the fluid within the pocket caused by a portion of the stream being deflected thereinto causes the loose and finely divided particles of sediment within the pocket to be picked up and to be carried with the fluid upwardly around both sides of the seat rings 8 and into the upper portion of the chamber 6 where, by reason of the relatively large volume of that portion of the chamber, the fluid is comparatively quiet. Again the sediment will tend to settle out of the fluid and inasmuch as the flow through the valve is substantially across the respective apertured seat rings, the sediment will be conveyed down into the main line flow and out of the valve, thus avoiding objectionable interference with the proper operation of the valve.

Should it be desired that a portion of the line flow or that pressure confined within the chamber 6 be relieved to atmosphere, the bonnet 2, as shown more clearly in Fig. 2, is provided with the inspection or cleanout plugs 13 which may either discharge into atmosphere or else be connected to discharge pipe lines leading to a suitable container. Thus it is apparent that if a considerable accumulation of sediment has deposited within the chamber 10, a cleanout or flushing medium may be suitably connected at the ports 7 upon removal of the plugs 11 or else connected in reverse order to thus create a forced circulation at the lower point of the valve casing and within the chamber 10 and force the accumulated sediment out, while the valve is in a closed position, around the substantially cylindrical projections 14 within which the body seat rings 8 are connected. Because the flushing may take place in my particular construction preferably with the valve disc in the seated or closed position, it is apparent that the valve line contents will in no way be disturbed and after making sure, by inspection of the outlets 13, that the valve has been thoroughly cleaned on the inside chambers 6 and 10, respectively, the balance of the cleaning or flushing fluid may then be drained from the respective ports 7 on either side of the valve casing.

Of course, the particular embodiment shown may be changed considerably from the construction illustrated and described and still come within the terms of my invention. Therefore, I desire to be limited only to the extent of the appended claims.

I claim:

1. A valve comprising a casing having a passageway therethrough, a bonnet therefor, a closure member for the said passageway, the said closure member having a lower depending lip portion, the said casing providing a pocket in the lower portion thereof for the accumulation of sediment, the said casing providing a chamber in the upper portion thereof in communication with the said pocket, the said bonnet having normally closed openings therefrom, the said casing having normally closed opposed openings level with the floor of the said pocket to form a substantially unbroken passage between said opposed openings, whereby upon the valve being closed and piped connections being made at said normally closed openings of the said bonnet, sediment within the said pocket may be forcibly rodded therefrom, and whereby upon the valve being partially opened, the lip portion of said closure member serves to divert a portion of the pipeline fluid into the said pocket to displace sediment therefrom into the said upper chamber to complete a cycle of circulation between the respective openings of the said bonnet and the said casing.

2. A valve comprising a casing having a passageway therethrough, a closure member for the said passageway, annularly formed seats for the said closure member, the said casing providing a pocket in the lower portion thereof for the accumulation of sediment, the said casing providing a chamber in the upper portion thereof for the reception of the closure member when the latter is in the open position, the said casing also providing annularly extending passageways around the said seats interconnecting the said pocket with the said chamber, the said closure member having substantially horizontally extending deflecting means for diverting a portion of the fluid flowing through the said valve into the said pocket, respective normally plugged oppositely disposed openings communicating exteriorly of the said pocket and the said chamber, whereby a rodding tool may be inserted into the said pocket upon opening the said plugged means to cooperate with the plugged openings of the said chamber to remove sedimentary deposits from the said pocket, the lower edge of the said deflecting means serving to direct the tool horizontally across the pocket floor upon insertion of said tool.

RALPH G. CARLSON.